(12) United States Patent
Schneider

(10) Patent No.: US 6,377,562 B1
(45) Date of Patent: Apr. 23, 2002

(54) WIRELESS ASYMMETRIC LOCAL LOOP (WASL) COMMUNICATION

(75) Inventor: Allan Schneider, Falls Church, VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 08/972,250

(22) Filed: Nov. 18, 1997

(51) Int. Cl.[7] .................................................. H04J 4/00
(52) U.S. Cl. ........................ 370/330; 370/436; 370/478
(58) Field of Search ................................. 370/310, 321, 370/328, 330, 329, 431, 436, 468, 478, 480, 483, 482, 485; 375/298; 455/452

(56) References Cited

U.S. PATENT DOCUMENTS

| | | |
|---|---|---|
| 3,864,524 A | 2/1975 | Walker |
| 4,630,257 A | 12/1986 | White |
| 4,750,165 A | 6/1988 | Champagne et al. |
| 4,774,704 A | 9/1988 | Gass et al. |
| 4,899,337 A | 2/1990 | Hirai |
| 4,993,025 A | 2/1991 | Vesel et al. |
| 5,231,628 A | 7/1993 | Boman |
| 5,247,347 A | 9/1993 | Litteral et al. |
| 5,260,967 A * | 11/1993 | Schilling |
| 5,272,697 A | 12/1993 | Fraser et al. |
| 5,528,281 A | 6/1996 | Grady et al. |
| 5,572,517 A | 11/1996 | Safadi |
| 5,604,742 A | 2/1997 | Colmant et al. |
| 5,613,191 A | 3/1997 | Hylton et al. |
| 5,889,845 A * | 3/1999 | Staples et al. ............... 379/211 |
| 5,956,642 A * | 9/1999 | Larsson et al. ............. 455/452 |
| 6,130,915 A * | 10/2000 | Hallier et al. ............... 370/345 |
| 6,240,094 B1 * | 5/2001 | Schneider ................... 370/412 |

* cited by examiner

Primary Examiner—Huy D. Vu

(57) ABSTRACT

A wireless, cellular radio link is provided from a base station to a plurality of subscriber stations within a cell reception area. Information data, which may be of textual, video or other format, are communicated asymmetrically as high bandwidth transmissions in the downstream direction to the users while low upstream bandwidth is provided to permit users to request the data or to provide return radio link condition information. Buffers associated with respective subscribers collect requested data from information providers for transmission by the base station in a statistical time division multiplexed (STDM) fashion, whereby each subscriber may be assigned a minimum transmission time interval during which data will be transferred from the associated buffer. Controlled logical token passing governs a variable token interval during which data transmission for each buffer is permitted in turn. Data fed from the buffers are combined in successive time intervals to form a data stream having a bit rate that can vary from interval to interval. The data stream is output as radio signals from a radio tower, each subscriber being equipped to receive that portion of the stream with which it is identified.

18 Claims, 3 Drawing Sheets

WIRELESS ASYMMETRIC LOCAL LOOP (WASL) COMMUNICATION

TECHNICAL FIELD

The present invention relates to data communication and more particularly to wireless asymmetric broadband delivery of data to a plurality of subscriber locations from a common wireless transmission source.

BACKGROUND OF THE INVENTION

The increasing availability of information in the form of data from various sources has spurred large public demand for broadband data transfer that challenges the capabilities of communication delivery systems. The number of information sources publicly and interactively available via the internet to personal computers, as well as private data network sources, continues to proliferate. Full motion video programming and source material also has rapidly progressed from early television broadcasting and cable distribution networks to a wide variety of distribution arrangements, including direct broadcast satellite television. The number of full motion video sources has expanded in response to increased usage and user demand for a greater range of subject matter content.

To meet user requirements, more robust broadband networks have evolved. For example, Litteral et al. U.S. Pat. No. 5,247,347 discloses a digital video distribution network providing subscribers with access to multiple Video On Demand service providers through the public switched telephone network. The subscriber may transmit ordering information via the public switched telephone network to the independent video information providers. Video programming may be accessed and transmitted to the subscriber directly from a video information provider (VIP) or through a video buffer located at a central office (CO) serving the subscriber. Connectivity between the central office and the subscriber for transmission of video data is provided by an asymmetrical digital subscriber line (ADSL) system. ADSL, which has been standardized by ANSI as T1.413, uses existing unshielded twisted pair copper wires from the telephone company central office to the subscriber's premises. Equipment at the central office and the subscriber's premises permits transfer of more high speed digital information signals to the subscriber than in the reverse direction. In the Litteral et al. patent, ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line. A similar public switched telephone network multimedia information ADSL delivery system is disclosed, for example, in U.S. Pat. No. 5,528,281 to Grady et al.

A number of patents have proposed various schemes for wireless distribution of information. Hylton et al. U.S. Pat. No. 5,613,191, for example, describes provision of interactive multimedia services including broad band video and audio data and control signals in a multiplexed form to subscriber premises via a communications link from a plurality of information providers. Real time encoders receive video programs and encode the information for those programs into packets of compressed digital data, e.g., in accord with a recognized video compression standard. The head end may also receive previously encoded video program material from other sources, such as a digital server or a digital transmission media. Multiplexers combine digital data for groups of programs into the multiplexed packet data streams. A digital modulator, such as a 64 or 256 QAM modulator, modulates each digitally multiplexed packet data stream for transport in one unique channel. A combined spectrum signal containing these channels is delivered to the subscribers' premises through suitable multimedia distribution and delivery architecture. The combined spectrum signal channel is connected to a network interface at the subscriber premises where it is up-converted to place the channels into available frequency channels in the UHF range. The unique channel from each digital modulator is fed to an up-converter synthesizer module which performs a frequency hopping spread spectrum technique. The frequency synthesizer uses an input frequency hopping spreading code to determine the particular frequency from within the set of frequencies in the broad frequency band to periodically generate the carrier wave. Frequency hopping codes are input to the frequency synthesizer by a frequency hopping code generator so that the carrier wave is frequency hopped. Each carrier is assigned a different spreading code so that each occupies a different channel during the same time period. The spreading codes are preferably orthogonal to one another so that cross-correlation between the spreading codes is approximately zero. The signals are fed to a suitable miniature subscriber premise antenna for radiation throughout the premises. At the receiver site within the premise a similar antenna receives a signal which is then down-converted and supplied to a wireless signal processor. The wireless signal processor, typically part of an interface module connected by a cable to the down-converter, processes the received wireless signal to select one of the channels. The wireless signal processor effectively acquires a digital multiplexed data stream from the selected channel and supplies that data stream to a digital signal processor. The digital signal processor selects packets of data relating to a selected one of the programs. The digital processing section processes the compressed, digitized data from those packets to produce signals presentable to the subscriber.

While developments such as the systems described above have advanced communication capabilities, limitations remain with respect to meeting the increasing requirements relating to volume of transmission, efficiency and flexibility. Network based systems that deliver data over twisted pair copper wire, even under ADSL communication conditions, are bandwidth limited.

The network data packet transmission modes, such as ATM and the like that have been developed to transport large quantities of video data with high speed and flexibility, contain significant cell overhead that dilutes the proportion of data information payload. ATM networks communicate all information in cells that comprise a well defined and size-limited header area and a user information, or payload, area. CCITT.121/2, the standardized ATM cell format, specifies a 5-byte header field and a 48-byte information or payload field. The header field carries information pertaining to ATM functionality, such as identification of the cells needed for routing purposes. Transfer is asynchronous in the sense that the recurrence of cells that contain information from any particular sender is not necessarily periodic. Each sending device using the ATM network submits a cell for transfer when it has a cell to send, not in accordance with a transmission time slot assigned to the device. The cell overhead is required to enable the ATM switch, or a plurality of ATM switches throughout the network, to rout the transport of cells within the switch and to translate the header information in the cells for appropriate routing of the succeeding ATM cell receiving element.

Wireless communication is less restrictive than the twisted pair wire plant insofar as bandwidth is concerned and does not require the cell overhead of network data transmission arrangements. Thus, cells received over the data network can be stripped of substantial cell overhead for wireless transmission over the subscriber final link. With wireless transmission, however, the signal strength of the radio link is subject to variation with physical conditions and distance. The quality of service of such data transmission thus can be degraded to an unacceptable bit error rate, particularly with transmission at high data rates. Without cognizance of the signal strength and bit error rate over each subscriber radio link, quality of service cannot be accurately assured. Further, present systems do not have efficient means for permitting multiple individual recipients of wireless signals from a given transmission source to presubscribe to different quality of service levels and minimum data throughput rates. For example, subscribers who are to receive real time video data would require a greater throughput at higher bit rate and lower bit error rate than subscribers to whom text is to be downloaded for storage. Other users may require each of these modes at different times but have no avail for subscribing to different quality of service levels on a scheduled or dynamic basis.

DISCLOSURE OF THE INVENTION

The present invention overcomes the above described difficulties in part by providing a wireless, cellular radio link from a base station to a plurality of subscriber stations within a cell reception area. Information data, which may be of textual, video or other format, are communicated asymmetrically, from the standpoint that high bandwidth transmissions occur in the downstream direction to the users while low upstream bandwidth is provided to permit users to request the data or to provide return radio link condition information. Data requests alternatively may be made by the users directly to information providers for delivery of the requested data to the wireless base station location.

An advantage of the present invention is that buffers associated with respective subscribers collect the requested data from the information providers for transmission by the base station in a statistical time division multiplexed (STDM) fashion. Preferably, controlled logical token passing governs a variable-plus-fixed token interval during which data transmission for each buffer is permitted in turn. Users thus can presubscribe to desired data throughput rates.

A further advantage of the present invention is that data fed from the buffers are combined in successive time intervals to form a data stream having a bit rate that can vary from interval to interval. The data stream is output as radio signals from a radio tower, each subscriber being equipped to receive that portion of the stream with which it is identified. The invention thus provides great flexibility in supplying individual user data throughput capacity, as each subscriber data transmission bit rate as well as its transmission time interval can be controllably varied.

A further advantage of the present invention is that variations of data transmission rate and interval for each subscriber can be separately controlled on the basis of both presubscribed levels and current quality of service levels of the radio link. Channel quality and/or bit error rate for each channel may be fed back dynamically from the user for each token interval. The invention thus takes into account quality of service considerations related to the strength of the radio link, which depends on the transmission path operation (e.g., lack of interference, distance, etc.) at any instant, and the contracted minimum data transmission level. The latter has direct bearing on how the token interval length is controlled for the subscriber. Both considerations may impact the data rate within the token interval. The system has the flexibility to change the contracted level on a scheduled or dynamic basis.

Data throughput for each token interval preferably, but not necessarily, occurs through orthogonal frequency division multiplexing (OFDM). Data serially received through the statistical time division multiplexer is output in parallel over separate frequency subcarriers, each modulated in accordance, for example, with quadrature amplitude modulation (QAM). The symbol (data output) rate for each subscriber is set in accordance with the quality of service considerations.

DESCRIPTION OF THE PREFERRED EMBODIMENTS

Figure 1:
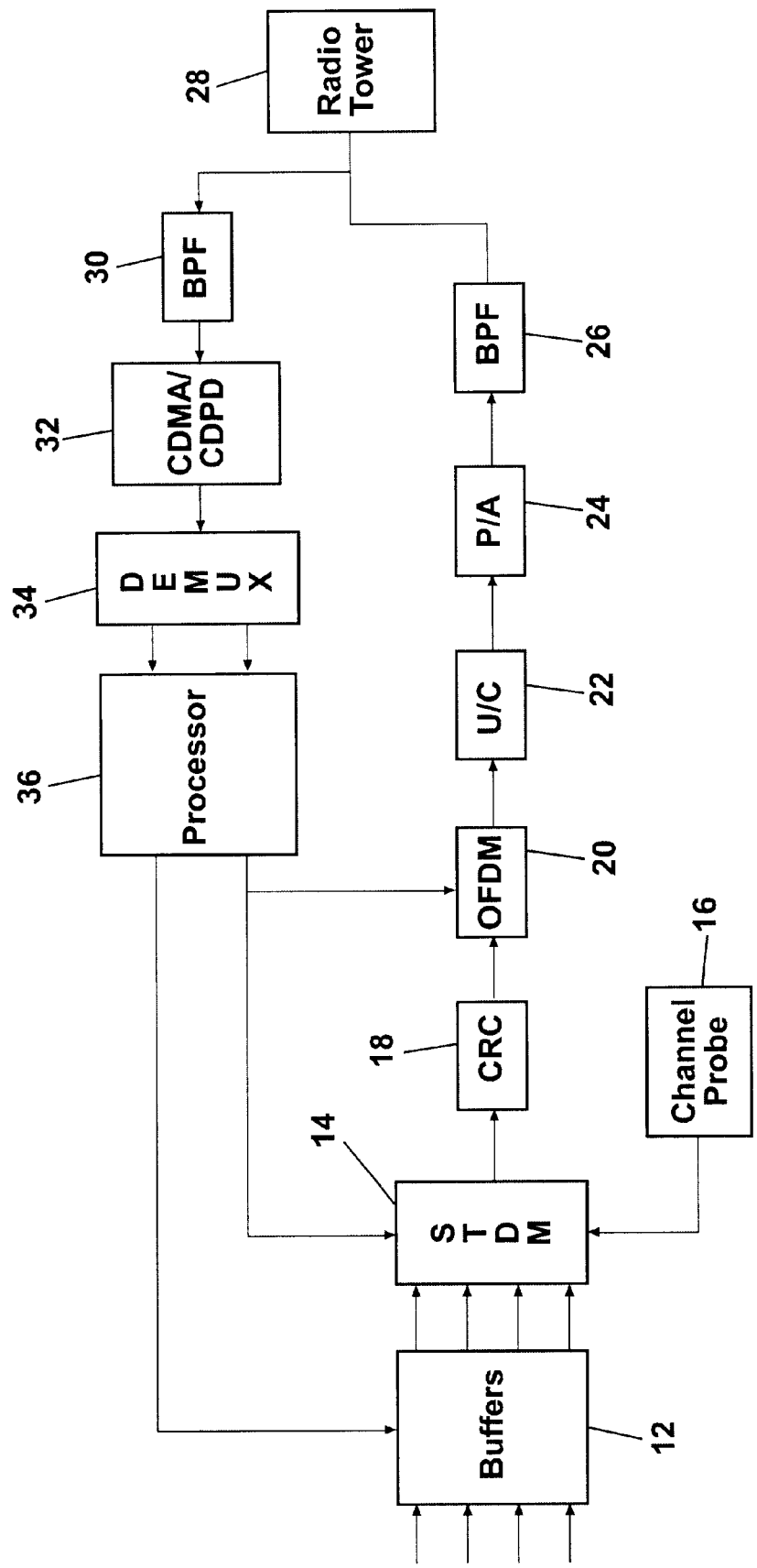
FIG. 1 is a block diagram of a wireless asymmetric local loop transmission base station arrangement in accordance with the present invention.

The elements of the base station according to a preferred embodiment of the invention are shown in FIG. 1. Buffers 12 have inputs for receiving data from information providers at constant or variable bit rates. Such data may have been transported, for example, via the internet and/or private data network. One or more buffers is associated with a respective subscriber having a location in the cell reception area of the base station. Incoming data from an information provider for that subscriber may be initiated in a direct request by the subscriber or via an external source. For example, data may be received via the internet under TCP/IP or other network level control. The buffers have an additional input from processor 36.

The outputs of buffers 12 are supplied to statistical time division multiplexer STDM 14, which additionally is supplied control signals from processor 36 and a test signal from channel probe 16. The channel probe generates a test signal that can be added to each subscriber channel to enable the destination to determine the strength and character of the signal channel. The output of STDM 14 is fed to cyclic redundancy check CRC 18, which adds parity check data. The output of CRC 18 is fed to the modulator 20, for example, an orthogonal frequency division multiplexer (OFDM), which additionally is connected to receive an input from processor 36. The modulated output is up converted in converter 22, passed through a power amplifier 24, then through band pass filter 26 and out to the radio tower 28, these elements collectively comprising a cellular wireless transmitter of the high data bandwidth portion of wireless asymmetric local loop (WASL) communication.

Signals received from WASL subscribers by the radio tower are fed to band pass filter 30. Alternatively, WASL subscriber signals could be forwarded to the station de-mux 34 via a cellular service provider or via the PSTN wireline. These alternatives would replace elements shown as 30 and 32. These signals are lower data bit rate signals that may comprise voice signals as well as data signals that are indicative of the quality of the radio link. These signals are more fully described hereinafter. The frequency band for these signals preferably are in the PCS range but can also be in the cellular range. Data are recovered from the signals received from the band pass filter 30 by processor 32 in accordance with the particular cellular communication scheme utilized. For example, data communication, including voice communication, may take the conventional code division multiple access (CDMA) format, while non-voice data communication may be in accordance with the cellular digital packet data (CDPD) standard. Voice signals, if any, can be separated from data signals and communicated through conventional network or wireless schemes.

The data portion of the received signals represents monitored channel quality of the link. Quality metrics may comprise two components: the signal character of the individual subcarriers, obtained from the channel probe, and the bit error rate performance obtained from the CRC error correction, both monitored at the subscriber premises and transported to the base station. Standard error checking detection methodology provides for generation of an Automatic Retransmission reQuest (ARQ) signal upon detection of an error. The data signals are fed to demultiplexer 34, which outputs probe signals and ARQ signals to quality of service processor 36. The ARQ signals are metrics indicative of error detection obtained from CRC data. The probe signals are metrics which characterize the transmission channel and frequency selectivity, e.g., signal strength. Processor 36 has an additional input (not shown in the drawing figure) for receiving data indicative of subscribed level of service for the associated subscriber. The processor thus provides a measure of the bit error rate, obtained from the ARQ signals, and of the wireless channel transmission quality, obtained from the probe feedback signals, to be compared against the quality of service criteria for each subscriber. Control signals, if appropriate, are responsively output by the quality of service processor 36. ARQ signals are applied to the buffers to enable the buffers to retransmit data corresponding to the detected errors, should such data remain in the buffers without having been rewritten. If necessary, ARQ signals can be transmitted back to the information provider, in conventional manner, for retransmission of data. Signals are output to the STDM and modulator by the processor 36 for regulation of the bit rate of the buffer outputs, the transmission interval duration set by the STDM, and the alphabet size/bit rate.

Figure 2:
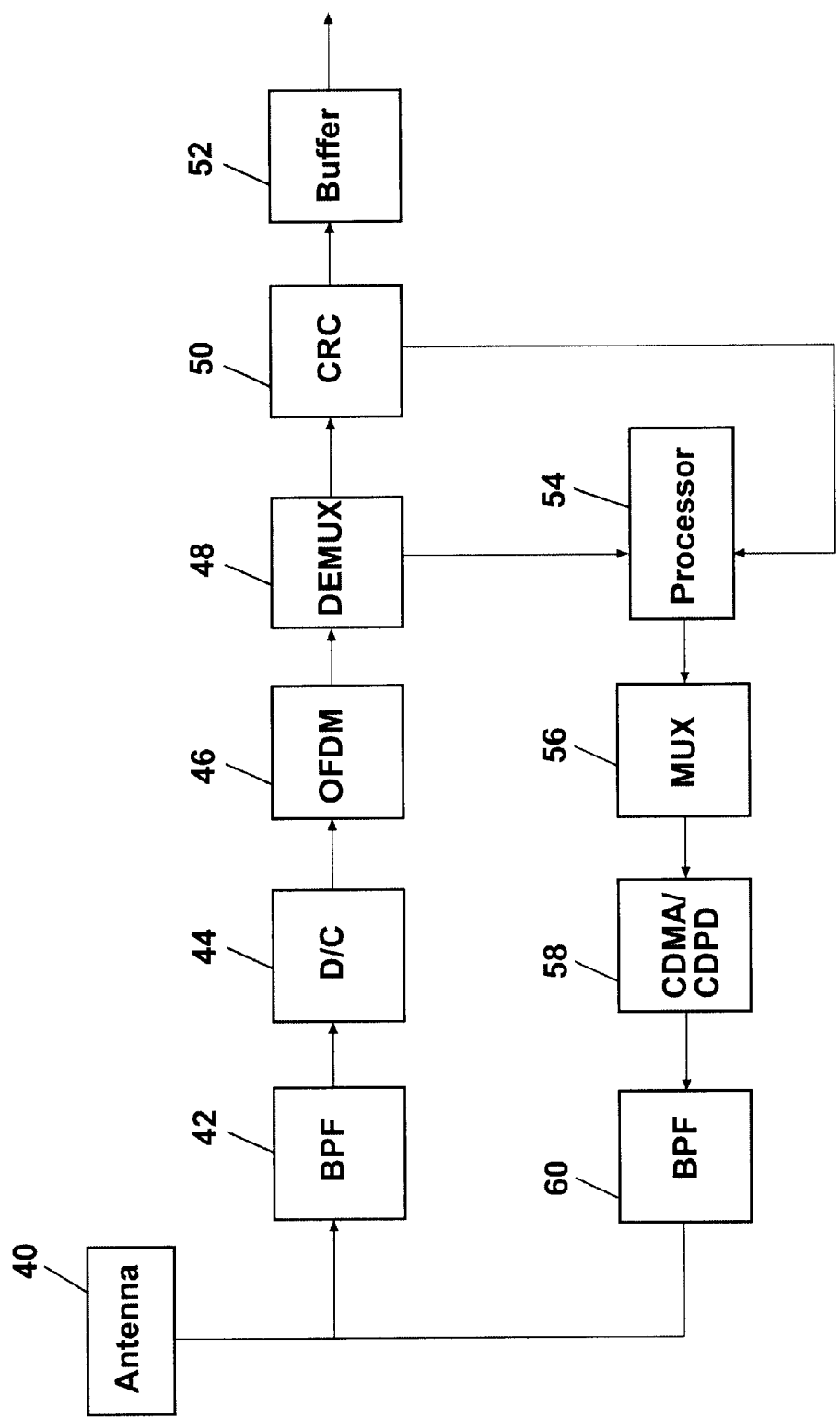
FIG. 2 is a block diagram of a wireless asymmetric local loop transmission subscriber station arrangement in accordance with the present invention.

FIG. 2 is block diagram representative of the elements of a subscriber station. Antenna 40 preferably may be an array antenna, for example, an adaptive phased array antenna, that can adjustably direct its beam toward the base station depending upon desired quality of service. For a better quality of service, the beam can be narrowed down and focussed on the base station to maximize signal strength without increasing the effective radiated power from the base station. Signals received by the antenna are fed to band pass filter 42, down converted by converter 44, fed to OFDM demodulator 46, and demultiplexed in de-mux 48. De-mux 48 outputs subscriber traffic data to be error checked by CRC block 50, the data then fed to buffer 52. The data are input to this buffer at a variable rate as the whole system is time-shared. The buffered data is then applied in accordance with the user's requirements.

Channel probe feedback signals are applied to channel assessment processing unit 54, which has an additional input to receive bit error data from CRC 50. Unit 54 output data is multiplexed at MUX 56, combined with voice signals, if any, and transmitted via CDMA voice and/or data or CDPD data only processing unit 58, and fed to band pass filter 60. The resulting signals are transmitted back to the base station by antenna 40, or alternative means.

In operation, a subscriber may request a download of information, for example, from a particular web site, via wireless or other communication. The information provider will feed data over a land line, such as the internet or private data network, at a constant or variable bit rate to the base station. From header information, the base station identifies the buffer associated with the subscriber and strips unnecessary overhead data. TCP/IP or the like protocol insures that the buffer will not be overloaded, by appropriately interrupting the transmission from the information provider. Each user may require a particular data throughput rate and quality of service, depending on individual needs and the type of data to be delivered. In accordance with the invention, the user is provided with options for preselecting quality of service and rate levels upon subscribing.

Figure 3:
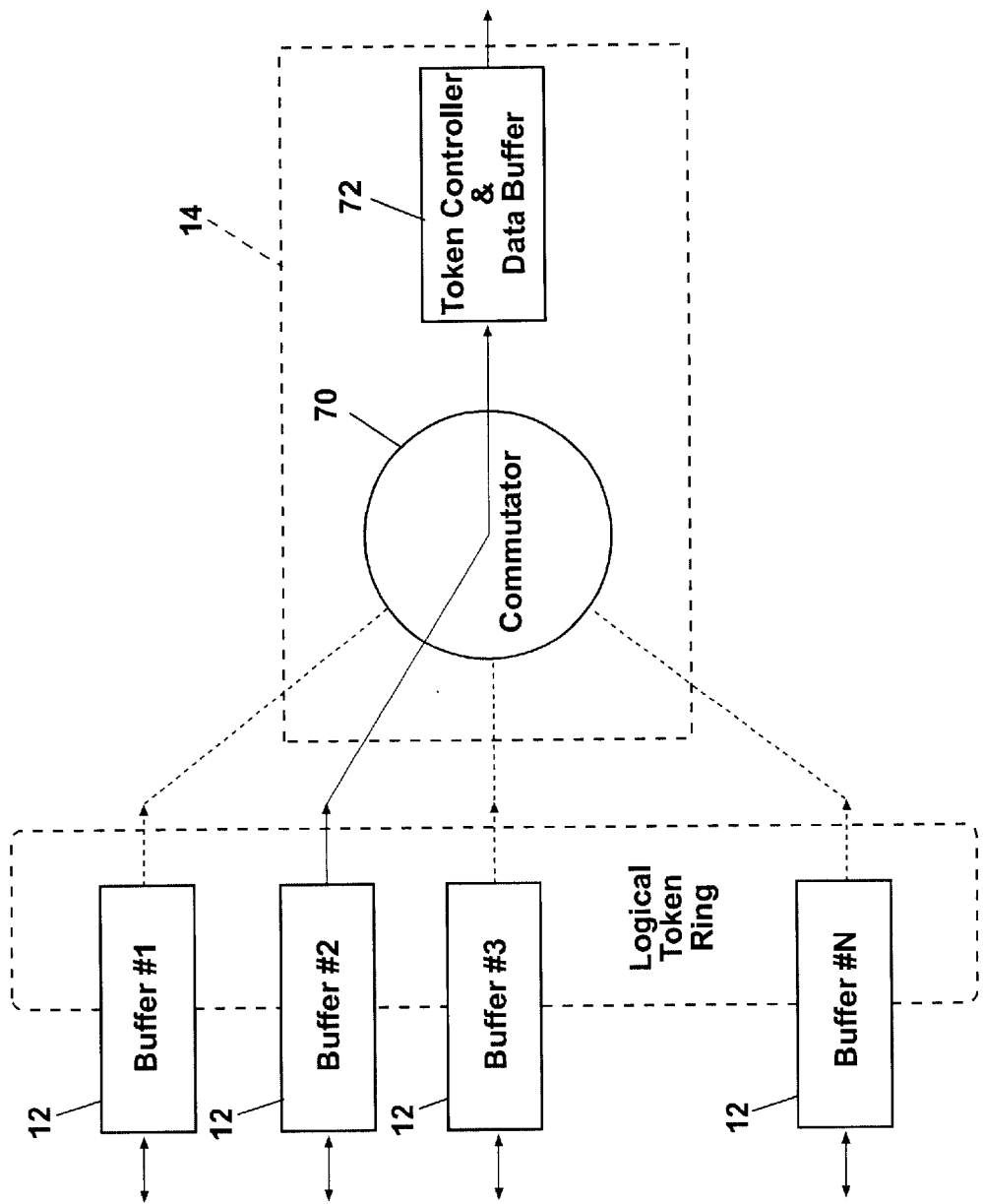
FIG. 3 is a block diagram that logically represents the interaction between the input buffers and statistical time division multiplexer shown in FIG. 1.

As the system is time shared, a plurality of buffers, up to the system capacity, simultaneously may contain data to be delivered to different subscribers. The timed interaction among the plurality of base station input buffers, whose outputs are multiplexed to a common data stream, can be understood with reference to the block diagram of FIG. 3. Statistical time division multiplexer 14 of FIG. 1 comprises elements that are diagrammatically represented by commutator 70 and token controller and data buffer 72. To accommodate different subscriber options while multiplexing data from respective buffers, the transmission time interval, as well as the output data bit rate, for each buffer is separately adjustable. By way of example, the invention can be constructed to handle bit rates of up to 80 megabits per second. The multiplexed time interval for transfer of data for each of buffers #1 through #N is controlled via commutator 70 with a timed token passing protocol, for example, the FDDI logical token ring standard. FDDI is a timed token passing protocol conventionally defined for a variable length protocol data unit. The token controller, in addition to having processing capability, comprises several timers, not shown, to determine how long a data source may send its data after "capturing" the token. While a specific statistical time division multiplexer is described in detail in commonly assigned, copending patent application Ser. No. 08/996,339, filed Dec. 22, 1997, any conventional token controller may be used in the preferred embodiment of the invention. It is to be understood that the dotted line logical token ring of FIG. 3 signifies the logical time transfer of the buffers in sequence, and does not represent a physical connection ring of buffers, such as the physical layer of remote stations in an FDDI network. The token controller defines a constant target token rotation time (TTRT) during which the token passes through an entire sequence of all buffers. The TTRT ensures that the latency period, or time duration between successive possible data transfers from any respective buffer, will be limited to an acceptable level.

Token passing is illustrated by the plurality of connections between the commutator and buffers, the solid line connection indicating that buffer #2 currently has the token for passing data through the commutator to the data buffer of the multiplexer. While the TTRT is relatively fixed, the time interval within the TTRT that each buffer can transmit data is variable. This variability can accommodate subscribers' different individual throughput and quality requirements. Each transmission interval can also be adjusted in accordance with the number of buffers that contain data to be transferred during the TTRT. If some buffers do not contain data, a greater portion of the target interval is available for the transmission by the other buffers.

Orthogonal frequency division multiplexer (OFDM) 20, which receives the multiplexed data stream with added forward error correction data, performs Quadrature Amplitude Modulation (QAM) for the data stream at a plurality of subcarrier frequencies. As well known, QAM encodes multiple bits per Hz (symbol size) for transmission. With an increase in the levels of amplitude and phase increments, i.e., larger symbol size, greater transmission capacity can be effected. High QAM capacity transmission, however, is subject to a greater number of transmission errors if the signal quality in the radio link suffers. OFDM 20, which may comprise a convention modulator, is capable of operation at different symbol bit levels.

The token controller can set the transmission data bit rate for each buffer during its token interval. In accordance with the invention, token intervals and transmission data bit rates can be adjusted for current physical conditions in the wireless link as well as for the subscribed transmission levels. A portion of each token interval can be reserved for transmission of signals generated by channel probe 16 (FIG. 1). These signals can be closely spaced, repetitive pulses or even tones that can be returned from the subscriber station as the feedback signals from which the quality of service processor 36 can determine whether the transmission bit rate and/or token interval for a respective subscriber should be adjusted in light of the current physical link conditions and the subscribed quality of service level. For example, when the quality of the wireless transmission link with a particular subscriber station is poor, channel assessment processing unit 54 will process the received demultiplexed probe signals and CRC data to provide the feedback signals transmitted back to the base station. The quality of service processor 36, which contains data indicative of that subscriber's contracted quality of service level, then makes appropriate adjustments. The processor, in response to an unacceptably high bit error rate, may adjust the QAM symbol size of OFDM 20 to a lower level. To avoid overload of the data buffer in the STDM 14 that may result from this correction, further adjustments may be necessary to data flow operations from the respective buffer 12. Such adjustments may comprise some combination by which the data bit rate or the token transmission interval for the subscriber's buffer is decreased to obtain the acceptable level of bit error rate without STDM buffer overload. If the subscriber also requires a high throughput rate, processor 36 may determine that the token transmission time interval may be increased while the transmission data bit rate for that buffer may be decreased to maintain acceptable levels. In the multiplexed environment, contract levels of the various subscribers, their data transmission activity at the particular time, and the quality of their wireless channel links, are factors with which processor 36 can account in its adjustment process. A lack of activity and/or high transmission link quality relating to other subscriber stations may permit decreases in the token transmission time intervals for those stations, thereby allowing a concomitant increase in token time for the subscriber station having a poor signal strength link. Activity may be sufficiently low to permit assignment effectively of a plurality of token intervals in a TTRT sequence to the station, whereby sufficient throughput at low bit error rate can be delivered.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, flexibility to change the contracted quality service levels for individual users on a scheduled or dynamic basis has been described. A user, when initially subscribing, can set a quality of service level schedule that reflects projected uses for various times, which may correspond to high quality video transmission during certain periods and text downloading at other times. Quality of service subscription data, including schedules, are stored in the memory of quality of service processor 36. In use, the subscriber's needs may change, on a temporary or permanent basis. Requests for change may be sent as wireless data signals upon receipt of which processor 36 can override its stored quality of service data for the subscriber. Changes can be made dynamically to presubscribed quality of service levels or schedules thereof, on a temporary or indefinite basis. Further, the invention may use conventional schemes other than QAM in the frequency division modulation functionality or comprise other conventional statistical time division multiplexers.

What is claimed is:

1. In a wireless asymmetric local loop (WASL) communication system for concurrent wireless transmission of broadband data signals individually to a plurality of users and reception of lower rate data signals from said users, a base station comprising:

a plurality of input buffers, each associated with one of said users;

a statistical time division multiplexer connected to said plurality of buffers for multiplexing data received from said buffers into a common data stream;

a frequency division multiplexer connected to receive said common data stream for modulating data thereof for each of said buffers to a respective subcarrier frequency; and an output transmitter connected to said frequency division multiplexer.

2. A base station as recited in claim 1, wherein said output transmitter comprises:

a converter for upconverting the frequency of the modulated data;

an amplifier having an input connected to said converter and an output;

a band pass filter having an input connected to the output of said amplifier and an output; and an antenna connected to the output of said band pass filter for transmitting data received therefrom.

3. A base station as recited in claim 1, wherein each of said input buffers has an input for receiving data from an information provider in response to a request from the associated user.

4. A base station as recited in claim 1, wherein said statistical time division multiplexer is connected to each of said input buffers to receive data therefrom in a token time interval of a repeatable time sequence for all buffers, the time duration for each buffer in said sequence being variable.

5. A base station as recited in claim 4, wherein said time division multiplexer is connected to a channel probe signal generator to receive channel probe signals therefrom, said received channel probe signals combined with received buffer data in said multiplexer.

6. A base station as recited in claim 4, wherein said time division multiplexer has an input for receiving feedback signals indicative of quality of service for a user.

7. A base station as recited in claim 6, wherein said feedback signals are indicative of channel transmission quality.

8. A base station as recited in claim 6, wherein said feedback signals are indicative of bit error rate in transmission.

9. A base station as recited in claim 6, wherein said frequency division multiplexer comprises a quadrature amplitude modulation (QAM) modulator of variable symbol size for each respective buffer, said frequency division multiplexer having an input for receiving said feedback signals.

10. A base station as recited in claim 9, further comprising:

a demultiplexer having an input to data recovered from said lower rate data signals received from said users; and a quality of service processor having at least one input connected to said demultiplexer and an output connected for supplying said feedback signals to said statistical time division multiplexer and to said frequency division multiplexer.

11. A base station as recited in claim 1, wherein said statistical time division multiplexer comprises:

a commutator connected to each of said buffers to pass data from the respective buffer only during the corresponding token time interval of said sequence;

a token controller for said commutator; and a data buffer connected to receive the buffer data.

12. In a wireless asymmetric local loop (WASL) communication system, a method for wireless transmission of broadband data concurrently and individually to a plurality of users, said method comprising the steps of:

individually buffering data from at least one information provider for each of said plurality of users;

statistically time division multiplexing the data buffered in said buffering step for each user in a repeating sequence to a common data stream;

modulating the data for each user from said common stream to a respective subcarrier frequency; and concurrently transmitting the frequency modulated data obtained in said modulating step to each user.

13. A method as recited in claim 12, wherein said multiplexing step comprises:

setting a minimum transmission time interval for each user in said sequence in accordance with a respective preset time interval level; and applying a logical token ring protocol to establish a variable token transmission time interval in said sequence for each buffer that is equal to or greater than the respective minimum transmission time interval in said setting step.

14. A method as recited in claim 13, further comprising the step of detecting quality of transmission and bit error rate conditions during each token transmission time interval, and wherein said multiplexing step further comprises:

setting a transmission bit rate for transmission of data from each buffer in accordance with a preset bit rate level for each respective user; and adjusting said transmission bit rate in response to a change in the detected conditions.

15. A method as recited in claim 13, wherein said multiplexing step further comprises:

defining a constant target token rotation time (TTRT) interval within which each complete sequence of token transmission time intervals occurs, whereby a latency period between successive possible data transfers from any respective buffer is limited to a set time span.

16. A method as recited in claim 14, wherein said multiplexing step further comprises:

determining a level of data transmission activity during each said sequence; and setting a token transmission time interval for a particular user greater than the corresponding minimum transmission time interval for said particular user in response to a determination of relative transmission inactivity by other users in said determining step; and adjusting the token transmission time interval for said particular user in response to said change in conditions detected in said detecting step for said particular user.

17. A method as recited in claim 12, wherein said modulating step comprises:

dividing a frequency spectrum into subcarrier frequencies respectively associated with said users; and quadrature amplitude modulating (QAM) each of said subcarrier frequencies with the data from the common data stream for the respective user.

18. A method as recited in claim 17, further comprising the step of detecting quality of transmission and bit error rate conditions for each user during transmission, and wherein said modulating step further comprises:

setting a QAM symbol level for each respective user; and adjusting said QAM symbol level in response to a change in the detected conditions.

* * * * *